United States Patent Office 3,102,105
Patented Aug. 27, 1963

3,102,105
POLYESTER OF (a) A DI-ALCOHOL CONTAINING A POLYCHLORINATED DIPHENYL RADICAL AND (b) A DICARBOXYLIC ACID
Georges Collardeau, Maurice Jean Reymermier, and Jean Robin, Lyon, France, assignors to Societe des Usines Chimiques Rhone-Poulenc, Paris, France, a French body corporate
No Drawing. Filed Nov. 5, 1958, Ser. No. 771,968
Claims priority, application France Nov. 12, 1957
6 Claims. (Cl. 260—45.4)

The present invention relates to new di-alcohols, their preparation and their use in the production of polyesters.

It is an object of the invention to provide new di-alcohols which shall be useful as starting materials in the manufacture of polyesters. A further obejct is to provide novel copolymers which have a high flame-resistance. Other objects will appear from the following description.

The novel di-alcohols of the present invention are compounds of the general formula $R(OR'OH)_2$ in which R is a divalent radical of a polychlorinated disphenyl containing at least 2, and advantageously at least 6, chlorine atoms, and R' is a divalent hydrocarbon radical, preferably an alkylene radical. The invention includes also polyesters made by the reaction of the novel di-alcohols with di-basic acids.

The di-alcohols may be made in accordance with the invention by the reaction of a chlorinated alcohol, e.g. a chlorhydrin, with an alkali metal salt of dihydroxypolychlorodiphenyl (which may be formed in situ from the dihydroxypolychlorodiphenyl and a caustic alkali), or of an olefine oxide with a dihydroxypolychlorodiphenyl. Preferably the chlorinated alcohol or olefine oxide is used in considerable excess, and the reaction is carried out by heating the reagents until substantially all the dihydroxypolychlorodiphenyl has reacted. The dihydroxypolychlorodiphenyls may be obtained by the controlled saponification of polychlorodiphenyls containing at least 4 chlorine atoms. It is not essential to isolate them before using them to make the di-alcohols.

As the chlorinated alcohol there may be employed an alkylene chlorhydrin, especially ethylene or propylene chlorhydrin, or a chlorinated alicyclic alcohol, e.g. chlorocyclohexanol.

Olefine oxides which may be used include ethylene oxide, propylene oxide and epoxycyclohexane.

The di-alcohols of the invention are valuable starting materials for the production of polyesters. For this purpose they may be esterified with saturated aliphatic dicarboxylic acids such as adipic acid and its higher or lower homologues, aromatic dicarboxylic acids such as terephthalic acid, and unsaturated dicarboxylic acids, especially aliphatic acids such as fumaric and maleic acids, if desired in admixture with saturated dicarboxylic acids. In the actual esterification step the acids can if desired be replaced by suitable esterifying derivatives thereof, e.g. anhydrides such as maleic anhydride. Known polyesterification methods can be used. In making the polyesters the di-alcohols of the invention may be employed in admixture with other di-alcohols such, for instance, as aliphatic glycols.

Valuable products are obtained by copolymerising the polymers derived from unsaturated acids with addition-polymerisable unsaturated monomers such, for example, as styrene or allyl phthalate. These copolymers and also the polyesters from which they are made are characterised by their flame-resistance.

The following examples illustrate the invention without limiting it.

EXAMPLE I

Preparation of Bis-(Hydroxyethoxy)Octachlorodiphenyl

Into a 250 cc. spherical flask provided with a mechnical stirrer, a reflux condenser, a thermometer and a nitrogen inlet are introduced in the following order:

129 g. (1.6 mol) of ethylene chlorhydrin
46.2 g. (0.1 mol) of dihydroxyoctachlorodiphenyl
8.98 g. (0.22 mol) of flaked 98% sodium hydroxide A light current of nitrogen is passed through and stirring, with cooling to maintain the temperature below 15° C., is continued until a homogeneous solution is obtained.

The mixture is then heated under reflux and the temperature of the reaction mass is maintained at about 114° C.

The reaction is followed by acidimetric titration of the sodium salt of the unreacted dihydroxyoctachlorodiphenyl using a pH meter.

When the condensation is complete, i.e. after about 75 minutes of reflux, the product is cooled to room temperature and the sodium chloride is filtered off and the excess of chlorhydrin is distilled off. There is obtained 55 g. of a residue which is solid at room temperature.

This product is brought into solution in 200 cc. of chloroform, and the solution obtained is washed twice with 10 cc. of hot 10% sodium hydroxide, and then with distilled water until neutral.

After drying over sodium sulphate, the chloroform is driven off by distillation. The solid product obtained is recrystallised from benzene. After two recrystallisations, it deposits white crystals melting at 127–128° C. on the Maquenne block. The chlorine and hyroxyl group titres correspond to those of bis-(hydroxyethoxy)octachlorodiphenyl. The product is insoluble in water, and soluble in ethanol, ether, chloroform and benzene at the boiling point (30 g. in about 100 cc.).

EXAMPLE II

Preparation of Bis-(Hydroxyethoxy)Octachlorodiphenyl

Into a 3-litre spherical flask provided with a mechanical stirrer, a Raschig ring column, a thermometer and nitrogen inlet are introduced:

499 g. (1 mol) of decachlorodiphenyl
500 g. of propylene glycol
163 g. of 98% sodium hydroxide in tablet form The mixture is heated at 160° C., while the water evolved is distilled off. After 30 minutes, the residual water is eliminated as a constant boiling mixture with cyclohexane, which is recycled for about 2 hours until the sodium hydroxide has completely reacted.

241.5 g. of ethylene chorhydrin (3 moles) are then added. The condensation is effected at 150° C. until the pH falls below 4. At this instant, the condensation has been effected only to an extent of about 90%; it can however be completed by cooling the reaction mass below 80° C., neutralising the free phenolic acidity by means of sodium hydroxide and continuing the condensation at 150° C. until the pH again falls below 4. The excess of chlorhydrin is distilled off under a vacuum of 30 mm. Hg.

The slightly yellowish reaction mass is treated at 80° C. with a mixture of chlorobenzene and water in a double-walled decanter. The product is washed with a sodium hydroxide solution and then with water until neutral. The chlorobenzene is driven off by distillation. There are obtained 537 g. of a slightly amber coloured amorphous solid containing 0.347 g. of hydroxyl group per 100 g. This solid consists for the greater part of bis-(hydroxyethoxy)octachlorodiphenyl melting at 127–128° C. and contains small quantities of the condensation product of bis-(hydroxyethoxy)octachlorodiphenyl) with one or more moles of ethylene oxide.

EXAMPLE III

*Preparation of Bis-(Hydroxyethoxy)Hexachlorodiphenyl*

A mixture of 645 parts of octachlorodiphenyl (commercial product known under the name Electrophenyl O) 398 parts of caustic potash in tablet form containing 84.5% of KOH, and 1500 parts of ethylene glycol is progressively heated with stirring so as to reach in 90 minutes a temperature of 197° C., which is maintained for 20 minutes. During this heating, 280 parts of a mixture of water and glycol are distilled off.

The mass is heated to 125° C., and 266 parts of chloroethanol are run into it in 10 minutes. The mixture is then heated to 150° C. and maintained at this temperature for 25 minutes in order to complete the reaction. After cooling to 10° C., the reaction mass is poured into 30,000 parts of chilled water at 5–7° C. and vigorously agitated. The product which precipitates is separated by filtration, washed with water until the washing water contains no further chlorine, and dried in vacuo.

There are thus obtained 730 parts of a white product melting at about 92–95° C., which is very soluble in acetone, ethanol, chloroform, and benzene, and sparingly soluble in cyclohexane.

Analysis gave the following figures:

Cl—calculated 44.2; found 44.6
Hydroxyl number—calculated 233; found 221

EXAMPLE IV

*Preparation of a Poly[Bis-(Hydroxyethoxy)Octachlorodiphenyl Fumarate]*

Into a spherical flask provided with a condenser, a thermometer, a stirrer and a carbon dioxide inlet are introduced:

575 parts of crude bis-(hydroxyethoxy)octachlorodiphenyl
127 parts of fumaric acid The mass is heated on an oil bath in a carbon dioxide atmosphere so as to reach 165° C. in two hours, whereafter this temperature is maintained for 9 hours. About 32 parts of water is collected. During the cooling of the polyester, 0.1 part of hydroquinone is dissolved in it.

To prepare a polyester resin, 65 parts of this polyester are dissolved in 35 parts of styrene. The solution so obtained has a viscosity of 5 poises at 25° C. and a colour on the Gardner scale of less than 4. Copolymerisation is effected in the presence of 1% of methylethyl ketone peroxide (in the form of a 60% solution in methyl phthalate) and of 0.2% of a cobalt octoate solution containing 6% of cobalt.

The polymer obtained is particularly flame-resistant and resistant to alkaline reactants. The deformation temperature is high. In the ASTM D 635–56 T test, the polymer is classified as self-extinguishing and offers better resistance to flames than polyester resins based on chlorendic acid. The resistance to sodium hydroxide is shown by the fact that a test piece measuring 15 x 10 x 2 mm. immersed at 95° C. for 24 hours in sodium hydroxide (36° Bé.) is substantially unattacked, its weight loss being less than 0.5%.

The polymer obtained has in addition the following characteristics:

Modulus of elasticity at 25° C. _____kg./cm.² __ 40.10³
Bending resistance _____kg./cm.² __ 670
Shock resistance (Dynstat) _____kg./cm.² __ 5.6
Deformation temperature (ASTM D 648–45 T) _____° C __ 107
Water absorption (24 hours at 25° C. on a plate 3 mm. thick) _____percent __ 0.13

EXAMPLE V

*Preparation of Poly-[Bis-(Hydroxyethoxy)-Octachlorodiphenyl Fumarate Adipate]*

Into a spherical flask provided with a condenser, a thermometer, a stirring device and a carbon dioxide inlet are introduced:

550 parts of bis-(hydroxyethoxy)octachlorodiphenyl
58 parts of fumaric acid
73 parts of adipic acid A steady current of carbon dioxide is passed through the mass while it is heated on an oil bath to reach a temperature of 180° C. in 2 hours. This temperature is maintained for 6 hours. About 32 parts of water are collected. During the cooling of the polyester, 0.1 part of hydroquinone is dissolved in it.

70 parts of the polyester thus obtained can be copolymerised with 30 parts of styrene in the presence of 0.15% of benzoyl peroxide to give a flame-resistant resin.

EXAMPLE VI

*Preparation of Poly-[Bis-(Hydroxyethoxy)Hexachlorodiphenyl Maleate] and its Copolymerisation with Styrene*

96.2 parts of bis-(hydroxyethoxy)hexachlorodiphenyl are heated with 23.2 parts of maleic acid in an inert atmosphere at 170° C. for 5 hours, the water produced by the reaction being azeotropically distilled off so that the reaction mass reaches an acid number equal to 26.

70 parts of the polyester thus obtained (stabilized by 0.01 part of hydroquinone) are dissolved in 30 parts of styrene. On addition of 2 parts of a commercial 50% solution of methylethyl ketone peroxide in methyl phthalate, and 0.2 part of cobalt naphthenate, this solution polymerises at 25° C. to give a transparent hard mass having a Young's modulus of 39,000 kg./cm.² and a bending resistance of 800 kg./cm.². When exposed to contact with a flame, this mass ceases to burn as soon as it is removed from the flame.

We claim:

1. As a new substance, a polyester of (a) a di-alcohol having the formula HO—R'—O—R—O—R'—OH, where R represents a divalent radical of a polychlorinated diphenyl containing at least 6 and up to 8 chlorine atoms and R' is a divalent saturated aliphatic hydrocarbon radical having from 2 to 3 carbon atoms, and (b) a dicarboxylic acid selected from the group consisting of saturated aliphatic dicarboxylic acids, mono-olefinic aliphatic dicarboxylic acids and aromatic dicarboxylic acids.

2. As a new substance, a polyester of (a) a di-alcohol having the formula

HO—CH₂.CH₂—O—R—O—CH₂.CH₂—OH where R represents a divalent radical of a polychlorinated diphenyl containing at least 6 and up to 8 chlorine atoms, and (b) a dicarboxylic acid selected from the group consisting of saturated aliphatic dicarboxylic acids, mono-olefinic aliphatic dicarboxylic acids and aromatic dicarboxylic acids.

3. As a new substance, a polyester of (a) a di-alcohol having the formula

HO—CH₂.CH₂—O—R—O—CH₂.CH₂—OH where R represents a divalent radical of a polychlorinated diphenyl containing at least 6 and up to 8 chlorine atoms, and (b) a polymethylene dicarboxylic acid.

4. As a new substance, a polyester of (a) a di-alcohol having the formula

HO—CH₂.CH₂—O—R—O—CH₂.CH₂—OH where R represents a divalent radical of a polychlorinated diphenyl containing at least 6 and up to 8 chlorine atoms, and (b) ethylene-1,2-dicarboxylic acid.

5. As a new substance, a polyester of (*a*) a di-alcohol having the formula

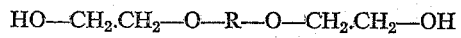

HO—CH$_2$.CH$_2$—O—R—O—CH$_2$.CH$_2$—OH where R represents a divalent radical of a polychlorinated diphenyl containing at least 6 and up to 8 chlorine atoms, and (*b*) ethylene-1.2-dicarboxylic acid co-polymerised with an additional polymerisable monomer containing an ethylenic bond.

6. As a new substance, a polyester of (*a*) a di-alcohol having the formula

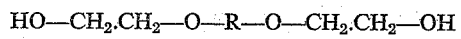

HO—CH$_2$.CH$_2$—O—R—O—CH$_2$.CH$_2$—OH where R represents a divalent radical of a polychlorinated diphenyl containing at least 6 and up to 8 chlorine atoms, and (*b*) ethylene-1.2-dicarboxylic acid co-polymerised with styrene.

References Cited in the file of this patent

UNITED STATES PATENTS

| | | |
|---|---|---|
| 2,158,957 | Coleman | May 16, 1939 |
| 2,449,088 | Smith | Sept. 14, 1948 |
| 2,496,067 | Rosenthal | Jan. 31, 1950 |
| 2,621,168 | Ross et al. | Dec. 9, 1952 |
| 2,799,694 | Ross et al. | July 16, 1957 |
| 2,819,247 | Lundberg | Jan. 7, 1958 |
| 2,822,340 | McGovern et al. | Feb. 4, 1958 |
| 2,874,046 | Klockgether et al. | Feb. 17, 1959 |